P. B. RUGGLES.
NEEDLE FOR TALKING MACHINES.
APPLICATION FILED FEB. 8, 1913.
1,061,408.
Patented May 13, 1913.
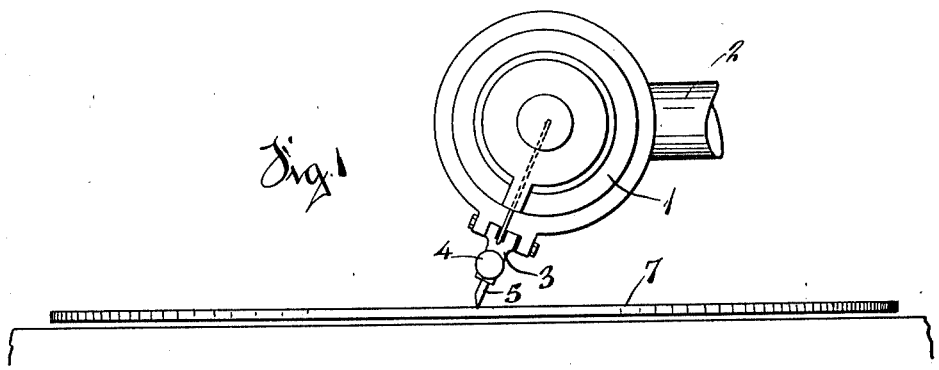
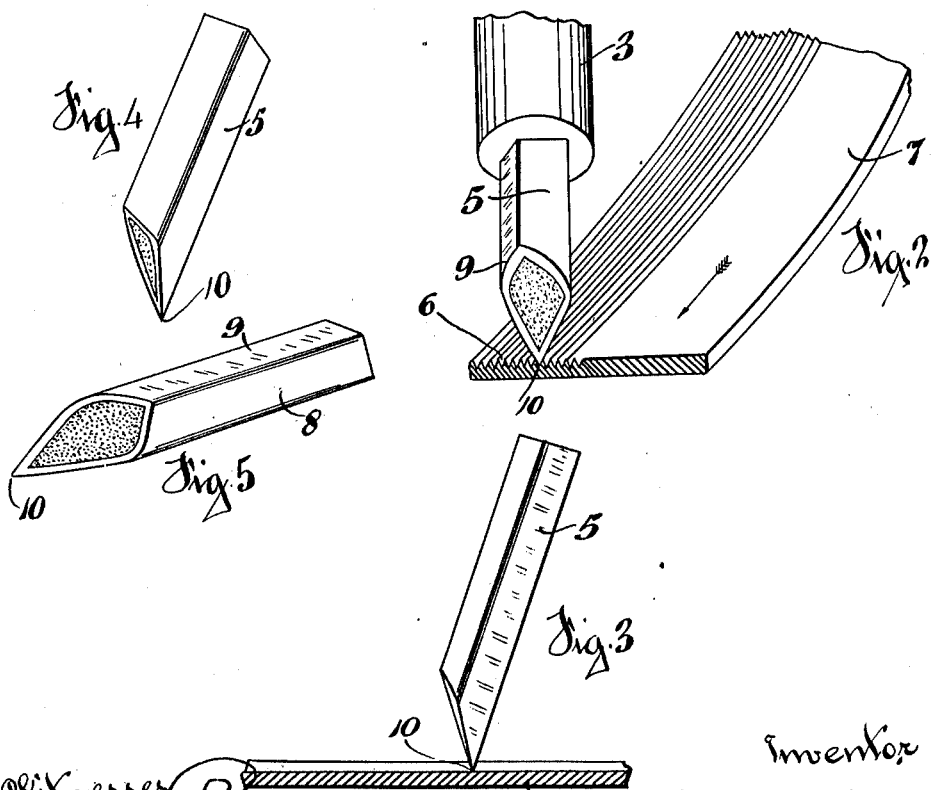
Inventor
Percy B. Ruggles
by Alfred M. Allen
Attorney

UNITED STATES PATENT OFFICE.

PERCY B. RUGGLES, OF WYOMING, OHIO.

NEEDLE FOR TALKING-MACHINES.

1,061,408.  Specification of Letters Patent.  Patented May 13, 1913.

Application filed February 8, 1913. Serial No. 747,029.

*To all whom it may concern:*

Be it known that I, PERCY B. RUGGLES, a citizen of the United States, and a resident of the village of Wyoming, in the county of Hamilton and State of Ohio, have invented certain new and useful Improvements in Needles for Talking-Machines, of which the following is a full, clear, and exact description, reference being had to the accompanying drawings, forming part of this specification.

The object of my invention is to provide a needle or stylus for sound reproducing machines, which shall have no injurious effect on and thus shall prolong the life of the records, and which shall be adapted to increase the harmony and eliminate the blasts of stringed instruments, while softening and mellowing the tones and entirely avoiding the unpleasant scratching so frequently noticeable in phonographic reproductions.

I have discovered that the shafts of the feathers of birds when denuded of barbs and properly sharpened possess in a remarkable degree the characteristics requisite for a perfect needle for transferring the recorded vibrations from the record to the reproducing diaphragm. I am aware that the quills of bird feathers have been suggested for this purpose, but quill points are not sufficiently rigid to withstand the strain of a long record, and the horny structure alone does not seem to be adapted to effectively transmit the necessary vibrations.

The shaft of the feather from which the barbs are removed, however, especially when properly pointed and preferably artificially hardened, as will be hereinafter described and claimed, fills the groove of the record and most delicately responds to its undulatory path so that perfect tonal effects are obtained with the complete elimination of all extraneous sounds, reproducing the sound waves as perfectly as they were originally delivered.

In the drawings, Figure 1 is a side elevation showing the reproducer head equipped with my improved needle. Fig. 2 is an enlarged perspective view illustrating the needle seated in one of the grooves of the record disk. Fig. 3 is a side elevation of the same. Figs. 4 and 5 are perspective views of the needle in different positions.

The reproducer head of a talking machine of ordinary construction is illustrated by the numeral 1, with the outer end of the swinging arm 2 and the holder 3 in which the needle 5 is secured usually in a socket in the holder by a set screw 4, the needle resting in the groove 6 of the rotary disk record 7.

While I have illustrated my construction as applicable to disk records, my improved needle is of course equally serviceable on cylindrical or other records.

The needle itself is formed from the shaft of a feather which has been denuded of the barbs, leaving the strip substantially rectangular in cross section, and these strips are cut up into proper lengths and sharpened to form the point of the needle. The shaft of the feather comprises an outer shell thicker on the top and bottom and comparatively thin on the sides from which the barbs have been removed, and with a softer interior portion.

I have found that a more rigid and substantial point is obtained by cutting the feather shaft on a diagonal plane, commencing at one of the corners of the top 8 and side 9 of the shaft and running to the opposite corner at 10. The point is thus supported and braced between the top and bottom and the sides. Then in mounting the needle in the holder, the needle is turned as indicated in Fig. 2, so that the point 10 shall be seated in the groove, with the sides of the feather parallel with the grooves of the record, so that the plane of the cut shall be radially disposed with reference to the record disk.

The feathers of any of the domestic fowls and of pigeons I have found very satisfactory for the construction of my needle. I do not, however, wish to be limited to the use of any particular feather, nor to the method of forming the point, as the essential feature of my invention consists in the discovery that the shaft of the feather itself, with its shell-like exterior and softer pithy interior is admirably adapted for the purpose. I have found, also, that it is of advantage and increases the effectiveness of the needle to harden the structure artificially by treatment with linseed oil, with a small amount of turpentine and rosin mixed therewith. The shafts are immersed for a brief period in the oil, and for speedy drying I also use with the mixture a small amount of Japan drier.

Having thus described my invention.

what I claim as new and desire to secure by Letters Patent, is:—

1. A reproducing needle formed from the shaft of a feather denuded of barbs and possessing an outer shell with softer interior.

2. A reproducing needle formed from the shaft of a feather denuded of barbs and possessing an outer shell with softer interior, and having a V-shaped point of the outer shell to enter and fill the record grooves.

3. A reproducing needle formed from the shaft of a feather denuded of barbs and possessing an outer shell with softer interior, with the structure artificially hardened.

4. A reproducing needle formed from the shaft of a feather denuded of barbs and possessing an outer shell with softer interior, and having a V-shaped point of the outer shell to enter and fill the record grooves, with the structure artificially hardened.

PERCY B. RUGGLES.

Witnesses:
THOMAS BENTHAM,
HELEN L. AICHHOLZ.